(12) United States Patent  
Friend et al.

(10) Patent No.: US 9,250,086 B1
(45) Date of Patent: Feb. 2, 2016

(54) MACHINE POSITIONING SYSTEM HAVING ALIGNMENT ERROR DETECTION

(71) Applicant: CATERPILLAR INC., Peoria, IL (US)

(72) Inventors: Paul Russell Friend, Morton, IL (US); Frank Arthur Willis, Canton, IL (US); Troy Kenneth Becicka, Sahuarita, AZ (US)

(73) Assignee: Caterpillar Inc., Peoria, IL (US)

( * ) Notice: Subject to any disclaimer, the term of this patent is extended or adjusted under 35 U.S.C. 154(b) by 0 days.

(21) Appl. No.: 14/466,929

(22) Filed: Aug. 22, 2014

(51) Int. Cl.
*G01C 21/20* (2006.01)
*G01S 19/47* (2010.01)

(52) U.S. Cl.
CPC .............. *G01C 21/20* (2013.01); *G01S 19/47* (2013.01)

(58) Field of Classification Search
CPC .......................... G01C 21/20; G01S 19/47
See application file for complete search history.

(56) References Cited

U.S. PATENT DOCUMENTS

| 5,390,125 A | 2/1995 | Sennott et al. |
| 8,594,879 B2 | 11/2013 | Roberge et al. |
| 8,639,416 B2 | 1/2014 | Jones et al. |
| 8,639,426 B2 | 1/2014 | Dedes et al. |
| 8,655,536 B2 | 2/2014 | Peake et al. |
| 2009/0326851 A1* | 12/2009 | Tanenhaus ............. G01C 21/16 702/96 |
| 2013/0211716 A1 | 8/2013 | Kellar |
| 2014/0100713 A1 | 4/2014 | Dedes et al. |

* cited by examiner

*Primary Examiner* — Mary Cheung
*Assistant Examiner* — Yuen Wong
(74) *Attorney, Agent, or Firm* — Finnegan, Henderson, Farabow, Garrett & Dunner, LLP

(57) ABSTRACT

A method and system for determining an alignment error between sensors mounted to a machine is disclosed. The method may include calculating a first orientation value based on a signal received from a first sensor. The method may further include calculating a second orientation value based on a signal received from a second sensor. The method may further include calculating an alignment error between the first sensor and the second sensor based on a difference between the first orientation value and the second orientation value.

16 Claims, 5 Drawing Sheets

MACHINE POSITIONING SYSTEM HAVING ALIGNMENT ERROR DETECTION

TECHNICAL FIELD

The present disclosure relates generally to a machine positioning system and, more particularly, to a machine positioning system having a mechanism for alignment error detection.

BACKGROUND

Autonomously and semi-autonomously controlled machines are capable of operating with little or no human input by relying on information received from various machine systems. For example, based on machine movement input, terrain input, and/or machine operational input, a machine can be controlled to remotely and/or automatically complete a programmed task. By receiving appropriate feedback from each of the different machine systems during performance of the task, continuous adjustments to machine operation can be made that help to ensure precision and safety in completion of the task. In order to do so, however, the information provided by the different machine systems should be accurate and reliable. The pose of the machine includes parameters whose accuracy may be important for control and positioning of the machine. For example, the pose of the machine may include position, velocity, orientation, acceleration, etc. of the machine.

Conventionally, machines may include a positioning system that relies on Global Navigation Satellite System (GNSS) data along with data from an Inertial Measurement Unit (IMU), which typically includes one or more accelerometers, to calculate the pose of the machine. The IMU may consist of, for example, a 3-axis accelerometer, 3-axis angular rate gyros, and sometimes a t-axis inclinometer. These sensors may need to be properly aligned with each other in order to provide an accurate pose solution. If these sensors are not aligned correctly, the pose calculation may be inaccurate as this inaccuracy may ultimately affect the performance of the machine. The causes of sensor misalignment are many and may include improper calibration, lack of calibration, or some physical movement of the sensors on the machine due to replacement, damage, or other unrelated maintenance.

U.S. Patent Publication No. 2013/0211716 to Kellar ("the '716 publication") discloses an arrangement in which a gross direction error is determined by calculating a difference between the vehicle direction indicated by the GNSS device and the direction indicated by the IMU device. Based on the direction error, the '716 publication determines whether the vehicle is traveling in a forward or reverse direction.

Although the arrangement of the '716 publication may provide a way to determine a direction error, it may not determine an alignment error. For example, it may not determine an alignment error where one of the two devices (e.g., GNSS device and IMU) is pitched, yawed, or rolled with respect to the other device. When an alignment error is present due to one device being pitched, yawed, or rolled with respect to the other device, the pitch, heading, and roll calculation of the machine may not be accurate.

The positioning system of the present disclosure is directed toward solving one or more of the problems set forth above and/or other problems of the prior art.

SUMMARY

In one aspect, the present disclosure is directed to a method for determining an alignment error between sensors mounted to a machine. The method may include calculating a first orientation value based on a signal received from a first sensor. The method may further include calculating a second orientation value based on a signal received from a second sensor. The method may further include calculating an alignment error between the first sensor and the second sensor based on a difference between the first orientation value and the second orientation value.

In another aspect, the present disclosure is directed a system for determining an alignment error between sensors mounted to a machine. The system may include a first sensor, a second sensor, and a controller in communication with the first sensor and the second sensor. The controller may be configured to calculate a first orientation value based on a signal received from the first sensor. The controller may be further configured to calculate a second orientation value based on a signal received from the second sensor. The controller may be further configured to calculate an alignment error between the first sensor and the second sensor based on a difference between the first orientation value and the second orientation value.

DETAILED DESCRIPTION

Figure 1:
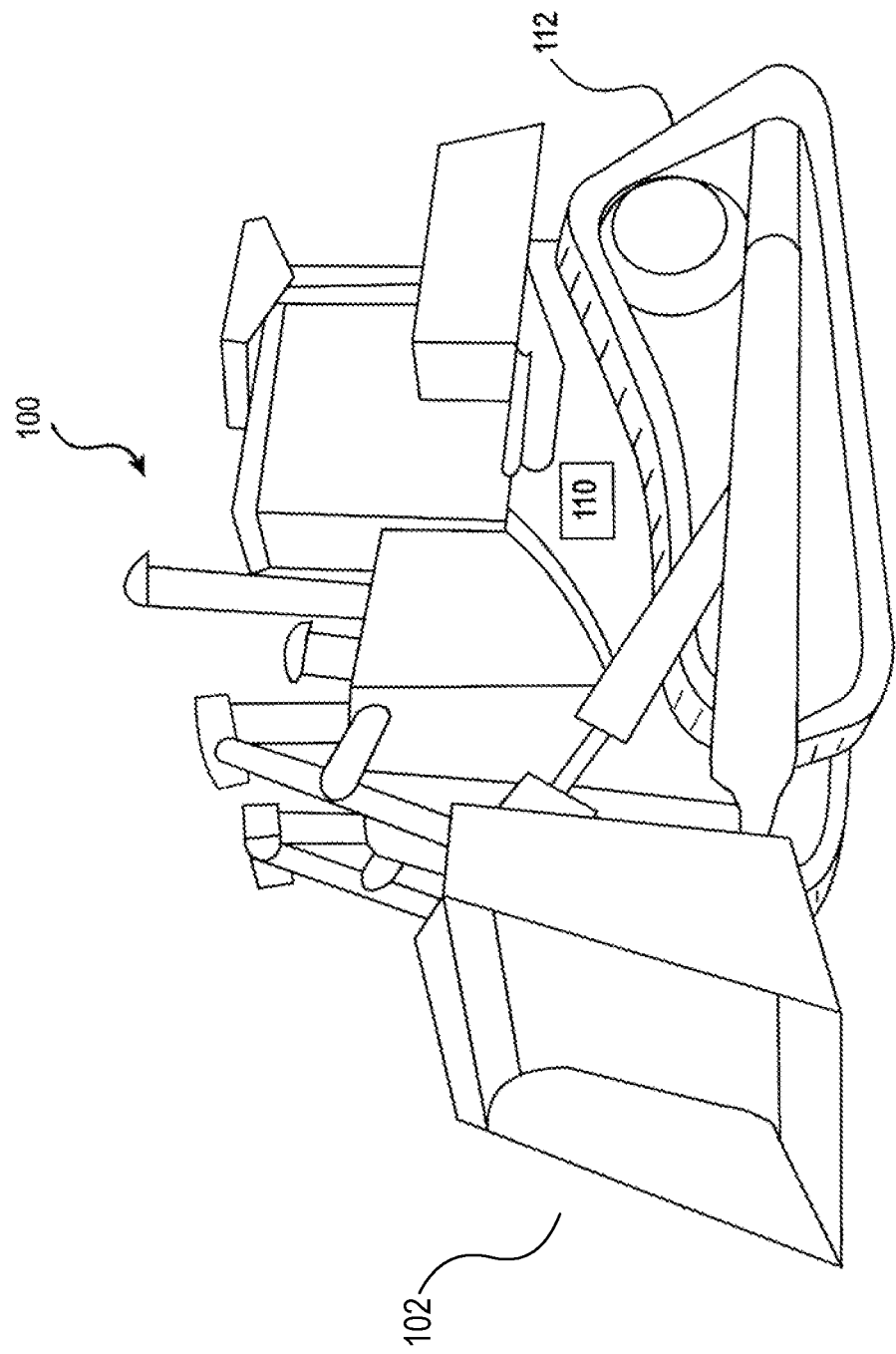
FIG. 1 is a diagrammatic illustration of an exemplary disclosed machine.

FIG. 1 illustrates a pictorial view of an earth-moving machine 100 having an earth moving implement 102. The earth-moving implement 102 may be utilized to move earth or soil. For illustrative purposes, the earth-moving machine 100 is shown as a track-type bulldozer and the earth-moving implement 102 is shown as a bulldozer blade. It will be apparent that exemplary aspects of the present disclosure may be utilized by any machine including other earth-moving machines, such as other track or wheel-type machines.

Machine 100 may generally include a frame that at least partially defines or supports an operator station, one or more engines mounted to the frame, a plurality of traction devices 112 driven by the engine to propel machine 100. Traction devices 112, in the disclosed exemplary embodiments, are tracks located at opposing sides of machine 100. Each track may be independently driven to turn machine 100 or simultaneously and dependently driven to propel machine 100 in a straight direction. It is contemplated that one or all of traction devices 112 may be replaced with another type of traction device, if desired, such as belts or wheels. In these situations, steering of machine 100 may be implemented by pivoting and/or tilting the traction devices, as is known in the art.

Figure 2:
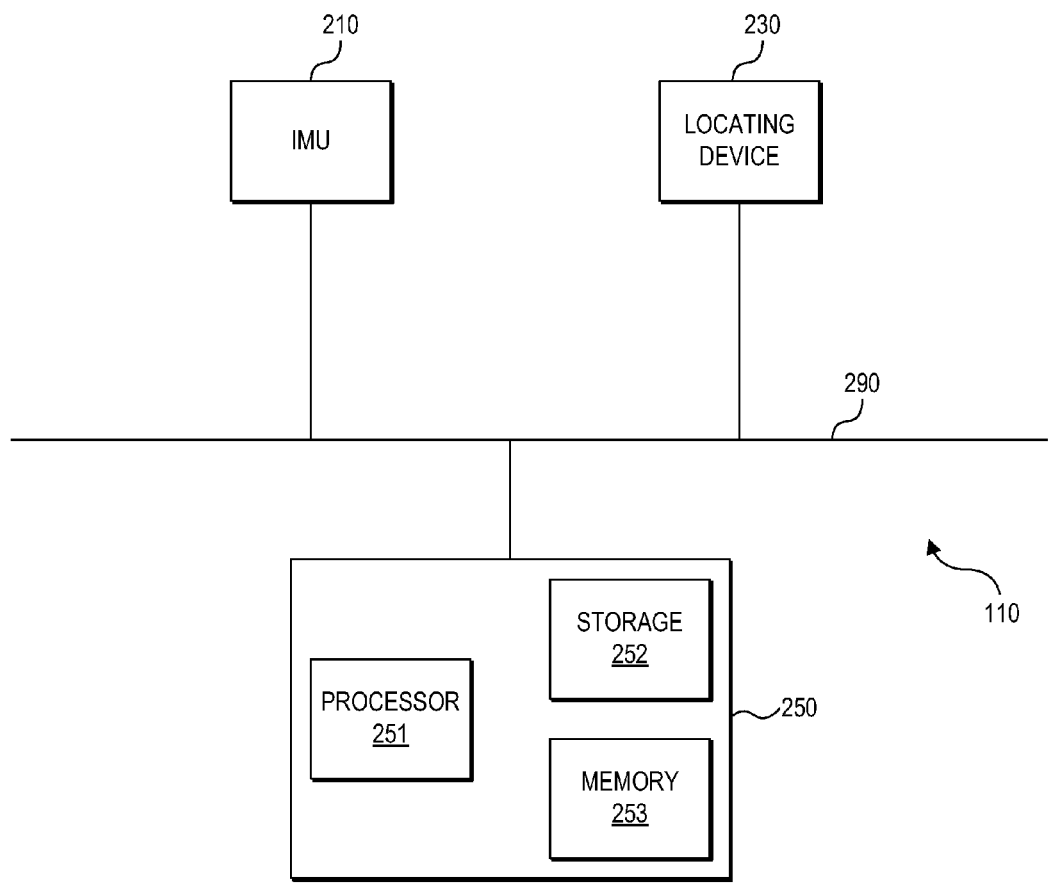
FIG. 2 is a diagrammatic illustration of an exemplary disclosed positioning system that may be used in conjunction with the machine of FIG. 1.

FIG. 2 illustrates a positioning system 110 that may be integrated with machine 100. Positioning system 110 may include an IMU 210, a locating device 230, and controller 250. The above sensors and controller 250 may be connected to each other via a bus 290. While a bus architecture is shown in FIG. 2, any suitable architecture may be used, including any combination of wired and/or wireless networks. Additionally, such networks may be integrated into any local area network, wide area network, and/or the Internet.

IMU 210 may include any device (such as a gyroscope) capable of measuring an angular rate (e.g., a yaw rate, pitch rate, roll rate) of machine 100, and producing a corresponding signal. Exemplarily, IMU 210 may include a 3-axis angular rate gyro that provides signals indicative of the pitch rate, yaw rate, and roll rate of machine 100. IMU 210 may also include one or more accelerometers and/or pendulous-based inclinometers capable of measuring the acceleration of machine 100 along one or more axes. The accelerometers may provide acceleration of machine 100 along a forward axis and such acceleration values may be utilized to determine a pitch of machine 100. Similarly, the accelerometers may provide acceleration of machine 100 along a side axis and such acceleration values may be utilized to determine a roll of machine 100. It will be noted that the acceleration values may be corrected to account for vehicle dynamics when used to calculate pitch or roll.

Locating device 230 may include any device capable of providing a signal that indicates machine 100's location. For example, locating device 230 could embody, a global satellite system device (e.g., a GPS or GNSS device), an Inertial Reference Unit (IRU), a local tracking system, a laser range finding device, an odometric or dead-reckoning device, or any other known locating device that receives or determines positional information associated with machine 100. Locating device 230 may be configured to convey a signal indicative of the received or determined positional information to one or more of interface devices for display of machine location. The signal may also be directed to controller 250 for further processing. In the exemplary embodiments discussed herein, locating device 230 provides a GPS signal as the location signal indicative of the location of machine 100. However, it will be understood by one of ordinary skill in the art that the disclosed exemplary embodiments could be modified to utilize other indicators of the location of machine 100, if desired.

Controller 250 may include a processor 251, a storage 252, and a memory 253, assembled together in a single device and/or provided separately. Processor 251 may include one or more known processing devices, such as a microprocessor from the Pentium™ or Xeon™ family manufactured by Intel™, the Turion™ family manufactured by AMD™, or any other type of processor. Memory 253 may include one or more storage devices configured to store information used by the controller 250 to perform certain functions related to disclosed embodiments. Storage 252 may include a volatile or non-volatile, magnetic, semiconductor, tape, optical, removable, nonremovable, or other type of storage device or computer-readable medium. Storage 252 may store programs and/or other information, such as information related to processing data received from one or more sensors, as discussed in greater detail below.

In one exemplary embodiment, memory 253 may include one or more alignment error detection programs or subprograms loaded from storage 252 or elsewhere that, when executed by processor 251, perform various procedures, operations, or processes consistent with disclosed embodiments. For example, memory 253 may include one or more programs that enable controller 250 to, among other things, collect data from the above-mentioned units and process the data according to disclosed embodiments such as those embodiments discussed with regard to FIGS. 3, 4, and 5, and detect an alignment error between locating device 230 and IMU 210 based on the processed data.

Controller 250 (more particularly, processor 251) may determine an alignment error between locating device 230 and IMU 210 by determining a difference in an orientation value (e.g., yaw, roll, pitch) calculated by these devices. For purposes of this description, it is assumed that locating device 230 includes one or more GPS receivers. For example, while machine 100 is static, a value may be calculated for the roll of machine 100 using dual GPS receivers mounted in a side-by-side configuration. An exemplary equation for calculating the roll of machine 100 using dual side-by-side GPS receivers is as follows:

$$\text{Roll(GPS)}=A\,\text{TAN}((Z2-Z1)/\text{SQRT}((X2-X1)^2+(Y2-Y1)^2)) \quad (1)$$

In equation (1) above, (X1, Y1, Z1) are location values indicated by one of the side-by-side GPS receivers and (X2, Y2, Z2) are location values indicated by the other side-by-side GPS receivers. Equation (1) assumes that the X-Y plane is the earth ground plane.

The roll value calculated using the GPS receivers may be compared to the roll value determined using acceleration values from IMU 210. To calculate the roll value, controller 250 may receive acceleration values measured by IMU 210 along the side axis of the machine and utilize the following equation:

$$\text{Roll(Inclinometer)}=a\,\sin(A/g) \quad (2)$$

where A=Acceleration along the axis of measurement; g=gravity (9.81 m/s^2).

The alignment error may be determined as a difference between Roll (GPS) and Roll (Inclinometer). For example, if Roll (GPS) is 40 degrees and Roll (inclinometer) is 35 degrees, the alignment error is 5 degrees. Controller 250 may determine if this alignment error is greater than a threshold. If it is greater than a threshold, controller 250 may either flag an error or compensate either the inclinometer or GPS roll measurement for the alignment error.

If the dual GPS receivers are in a forward-aft configuration and machine 100 is static, controller 250 may also determine an alignment error between locating device 230 and IMU 210 by comparing a pitch value calculated by the dual GPS receivers and the pitch value calculated by IMU 210. The pitch value for IMU 210 may be calculated by controller 250 using the following equation where A=acceleration along the forward axis of machine 100:

$$\text{Pitch(Inclinometer)}=a\,\sin(A/g) \quad (3)$$

The pitch value for the forward-aft GPS receivers when machine 100 is static may be calculated using the following equation:

$$\text{Pitch(GPS)}=A\,\text{TAN}((Z2-Z1)/\text{SQRT}((X2-X1)^2+(Y2-Y1)^2)) \quad (4)$$

In equation (4) above, (X1, Y1, Z1) are location values indicated by one of the forward-aft GPS receivers and (X2, Y2, Z2) are location values indicated by the other forward-aft GPS receivers. Equation (4) assumes that the X-Y plane is the earth ground plane.

The alignment error may be determined as a difference between Pitch (GPS) and Pitch (Inclinometer). For example, if Pitch (GPS) is 40 degrees and Roll (inclinometer) is 35 degrees, the alignment error is 5 degrees. Controller 250 may determine if this alignment error is greater than a threshold. If it is greater than a threshold, controller 250 may either flag an error or compensate either the inclinometer or GPS pitch measurement for the alignment error.

The above description may be applicable when machine 100 is static. When machine 100 is moving, or is in a dynamic state, an alignment error may be determined by calculating a pitch value using a single GPS receiver and comparing it with the pitch value calculated using the inclinometer acceleration values (equation (3) above). To calculate the pitch value using a single GPS receiver, controller 250 may utilize the following equation:

$$\text{Pitch(GPS)} = A\ \text{TAN}((Z2-Z1)/\text{SQRT}((X2-X1)^2+(Y2-Y1)^2)) \quad (5)$$

where (X1, Y1, Z1) and (X2, Y2, Z2) are location values for consecutive readings by the single GPS receiver of locating device 230. Again, equation (5) assumes that the X-Y plane is the earth ground plane. Also, if the alignment error is greater than a threshold, controller 250 may either flag an error or compensate either the inclinometer or GPS pitch measurement for the alignment error. It will be noted that the term "single GPS receiver" may denote a GPS receiver separate from a dual GPS receiver combination or one of the dual GPS receivers.

When machine 100 is in a dynamic state, controller 250 may determine an alignment error in the dual GPS receiver lever arm by comparing the heading calculated using one of the dual GPS receivers and the heading calculated using both the dual GPS receivers. For example, controller 250 may determine a heading using consecutive positions of one of the dual GPS receivers. An exemplary equation is as follows:

$$\text{Heading(single receiver)} = A\ \text{TAN 2(Easting2}-\text{Easting1, Northing2}-\text{Northing1)} \quad (6)$$

where (Easting1, Northing1) and (Easting2, Northing2) refer to consecutive easting and northing values of the single receiver. To calculate the heading using both receivers, controller 250 may utilize the following exemplary equation:

$$\text{Heading(dual receivers)} = A\ \text{TAN 2(Easting2}-\text{Easting1, Northing2}-\text{Northing1)} \quad (7)$$

Controller may determine an alignment error in the dual GPS receiver lever arm by taking the difference between the single GPS receiver heading and the dual GPS receivers heading. If the alignment error is more than a threshold, controller 250 may either flag an error or compensate for the dual GPS lever arm alignment error.

Figure 3:
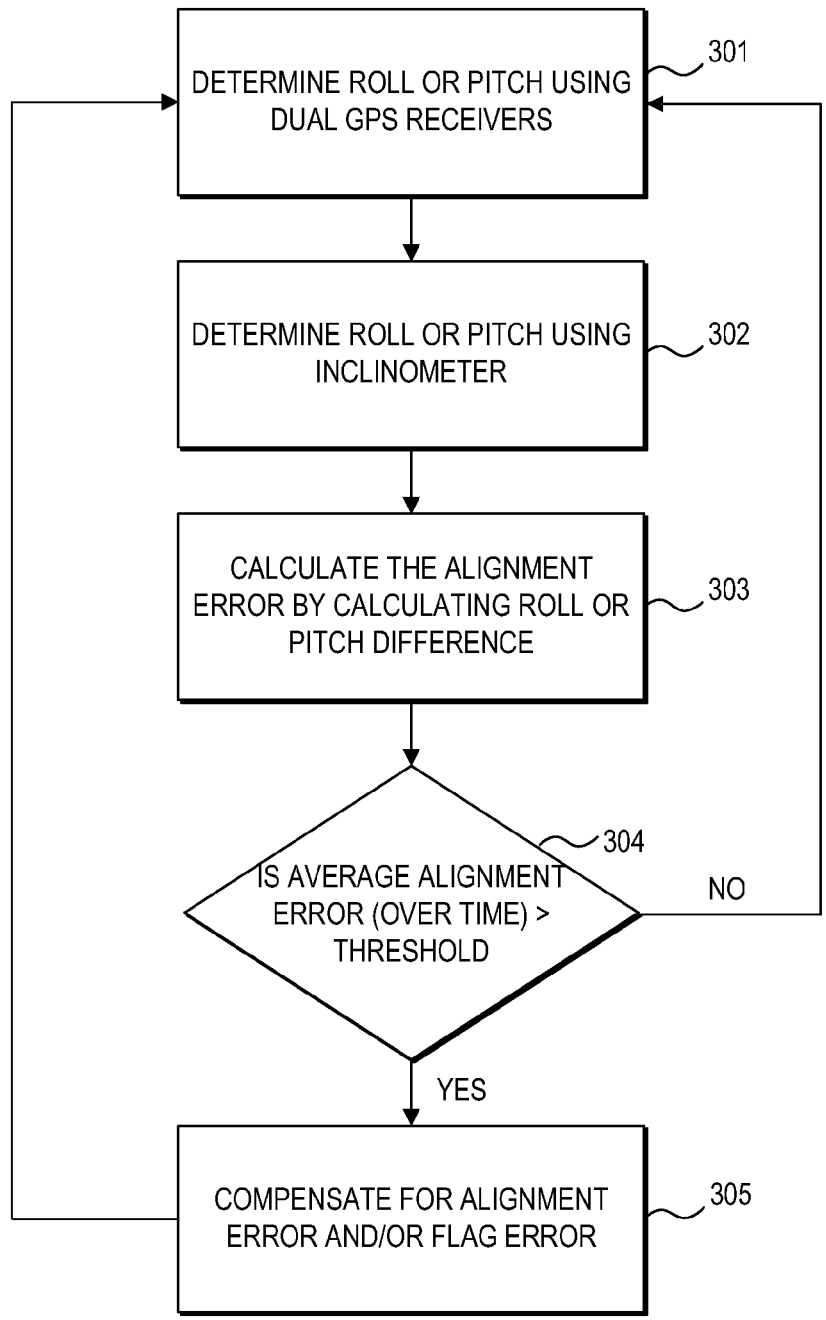
FIG. 3 is a flowchart illustrating an exemplary method performed by the disclosed positioning system.
Figure 4:
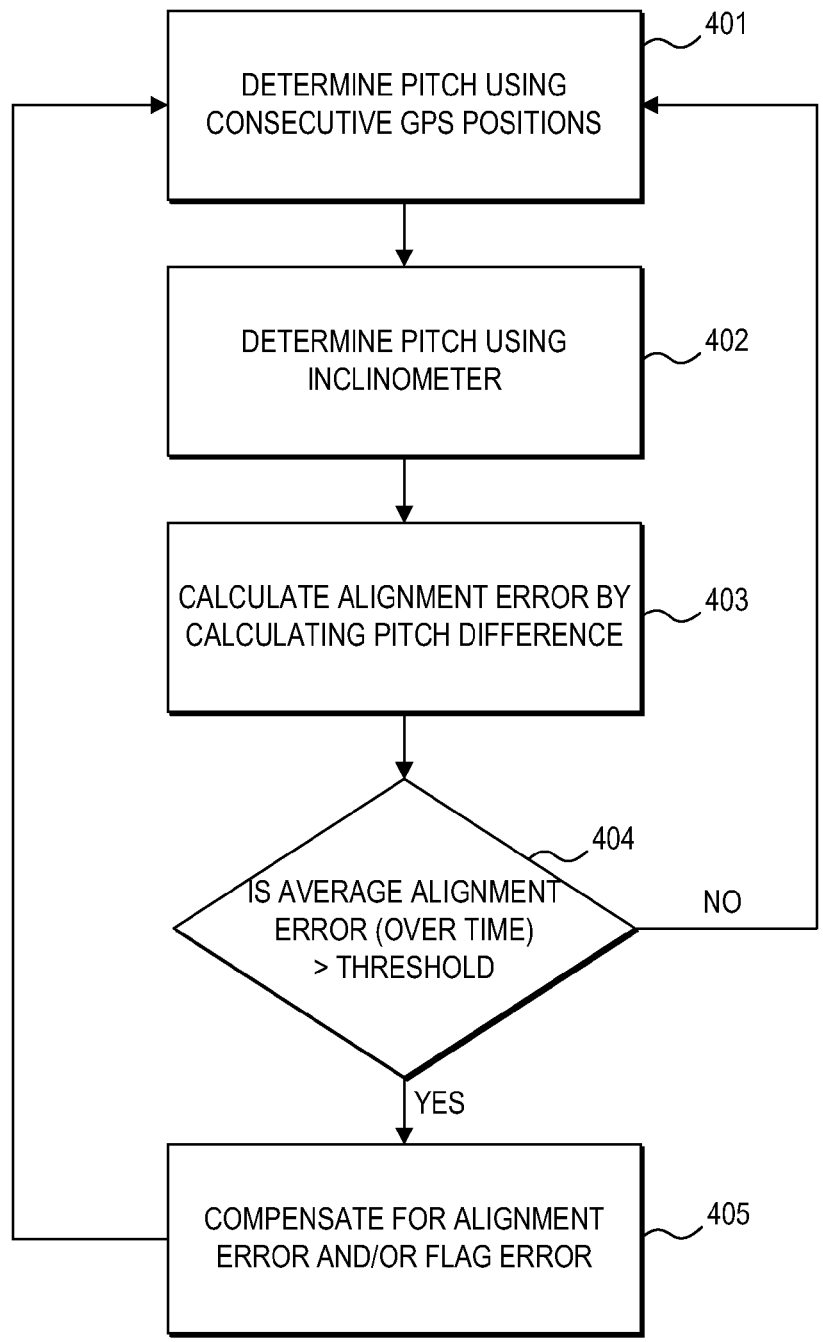
FIG. 4 is a flowchart illustrating an exemplary method performed by the disclosed positioning system.
Figure 5:
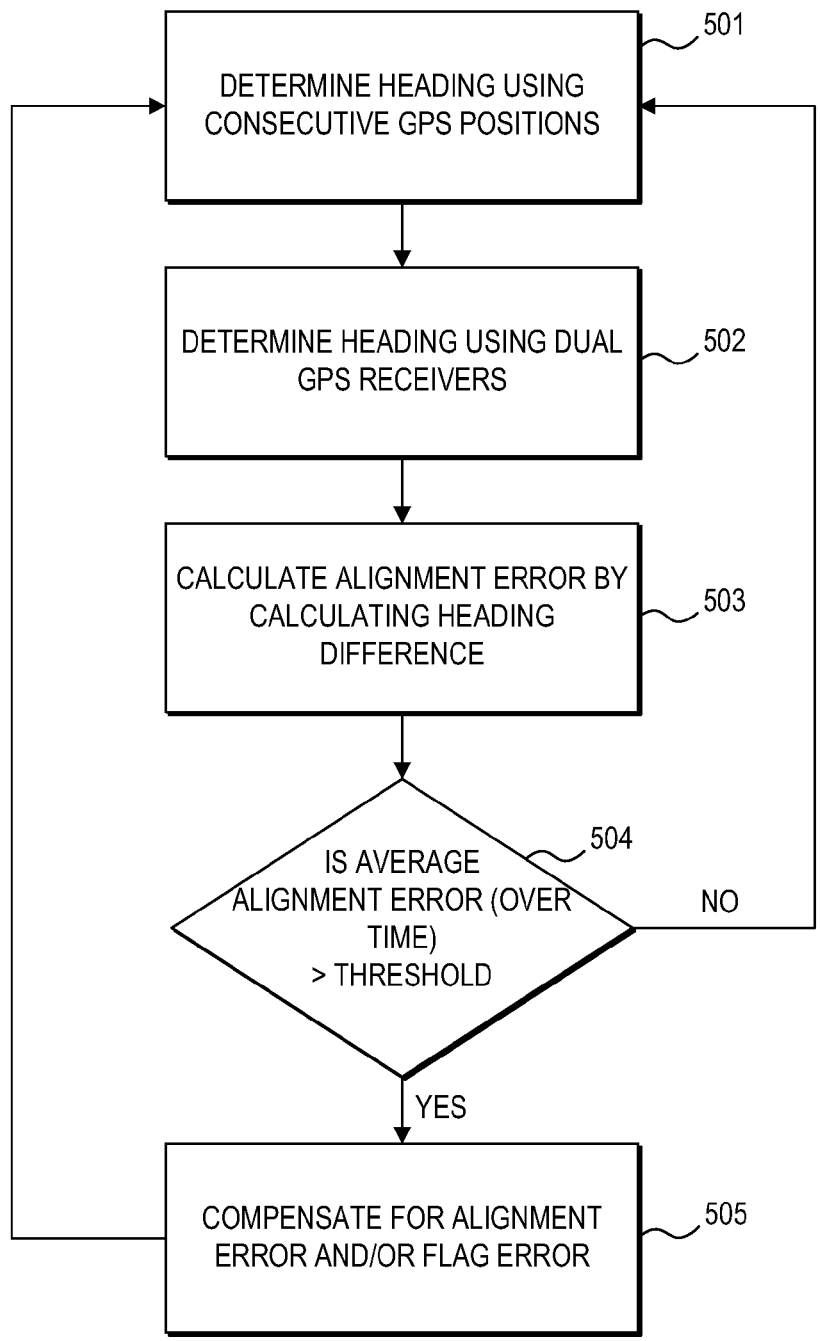
FIG. 5 is a flowchart illustrating an exemplary method performed by the disclosed positioning system.

FIGS. 3, 4, and 5 further describe exemplary operations of controller 250 to estimate an alignment error with respect to locating device 230 and IMU 210. A detailed description of FIGS. 3, 4, and 5 is provided in the next section.

INDUSTRIAL APPLICABILITY

The disclosed positioning system 110 may be applicable to any machine where accurate detection of the machine's pose is desired. The disclosed positioning system 110 may provide for improved estimation of the pose of machine 100 by considering an alignment error between locating device 230 and IMU 210. Operation of the positioning system 110 will now be described in connection with the flowcharts of FIGS. 3, 4, and 5 beginning with FIG. 3.

FIG. 3 illustrates an exemplary flowchart to calculate an alignment error between locating device 230 and IMU 210 when machine 100 is static. In step 301, controller 250 may determine the roll or pitch of machine 100 using dual GPS receivers of locating device 230. For example, if the dual GPS receivers are in a side-by-side configuration, controller 250 may determine the roll of machine 100 using equation (1) above ("Roll (GPS)"). If the dual GPS receivers are in a forward-aft configuration, controller 250 may determine the pitch of machine 100 using equation (4) above ("Pitch (GPS)").

In step 302, controller 250 may determine the roll or pitch of machine 100 using acceleration values received from the IMU 210 inclinometer. To determine Roll (IMU), controller 250 may utilize equation (2) where the acceleration values are along the side axis. To determine Pitch (IMU), controller 250 may utilize equation (3) where the acceleration values are along the forward axis.

In step 303, controller 250 may calculate an alignment error by calculating the difference between the Roll (GPS) and Roll (Inclinometer). If the pitch values were calculated, controller 250 may determine an alignment error by taking the difference between the Pitch (GPS) and Pitch (Inclinometer). In step 304, controller 250 may take an average (over time) of the alignment error and determine whether the average alignment error is greater than a threshold value. For example, controller 250 may determine a running average of the alignment error using the last ten alignment error values. The number ten is only an example and any suitable value may be used to calculate an average of the alignment error over time.

If the average alignment error is less a threshold value (step 304: NO), controller 250 may return to step 301 as the alignment error is deemed to be negligible. If the average alignment error is greater than the threshold value (step 304: YES), controller 250 may either flag an error or compensate either the inclinometer or GPS roll measurement for the alignment error. For example, controller 250 may compensate either the inclinometer or GPS roll measurement for the alignment error if the alignment error is greater than the threshold value but smaller than a second threshold value. If the alignment error is greater than or equal to the second threshold value, controller 250 may flag an error. A detailed example of this is provided next.

Assume that the threshold value for the alignment error is two degrees, and the second threshold value is five degrees. If the alignment error is six degrees, i.e., greater than the second threshold value, controller 250 may flag an error. However, if the alignment error is four degrees, i.e., less than the second threshold, controller 250 may compensate either the inclinometer or GPS roll measurement for the alignment error. Now, controller 250 may decide whether to add or subtract the alignment error from the inclinometer reading or the GPS reading based on which device has a lower probability of having an alignment error. If the GPS reading has a lower probability of having an alignment error, the inclinometer reading may be adjusted. For example, if Roll (GPS) is 40 degrees and Roll (Inclinometer) is 35 degrees, 5 degrees may be added to the inclinometer roll measurement. Similarly, if Roll (GPS) is 40 degrees and Roll (Inclinometer) is 45 degrees, 5 degrees may be subtracted from the inclinometer roll measurement. The above description for steps 304 and 305 also applies to the alignment error with respect to pitch (e.g., the difference between Pitch (GPS) and Pitch (Inclinometer) from step 303). After step 305, controller 250 may return to step 301.

FIG. 4 illustrates an exemplary flowchart to calculate an alignment error between locating device 230 and IMU 210 when machine 100 is in a dynamic state. In step 401, controller 250 may calculate pitch of machine 100 using consecutive GPS positions of a single GPS receiver of locating device 230 ("Pitch (GPS)"). For example, controller 250 may determine the Pitch (GPS) of machine 100 using equation (5) above. In step 402, controller 250 may determine the pitch of machine 100 using acceleration values received from the IMU 210 inclinometer ("Pitch (IMU)"). To determine Pitch (Inclinometer), controller 250 may utilize equation (3) where the acceleration values are along the forward axis. In step 403, controller 250 may calculate an alignment error, which may be equal to the difference between Pitch (GPS) and Pitch (Inclinometer).

In step 404, controller 250 may take an average (over time) of the alignment error and determine whether the average alignment error is greater than a threshold value. For example, controller 250 may determine a running average of the alignment error using the last ten alignment error values. The number ten is only an example and any suitable value may be used to calculate an average of the alignment error over time. If the average alignment error is less a threshold value (step 404: NO), controller 250 may return to step 401 as the alignment error is deemed to be negligible. If the average alignment error is greater than the threshold value (step 404: YES), controller 250 may either flag an error or compensate either the inclinometer or GPS pitch measurement for the alignment error. For example, controller 250 may compensate either the inclinometer or GPS pitch measurement for the alignment error if the alignment error is greater than the threshold value but smaller than a second threshold value. If the alignment error is greater than or equal to the second threshold value, controller 250 may flag an error. The details of steps 404 and 405 are similar to steps 304 and 305 discussed earlier. Accordingly, a further description is omitted for purposes of conciseness.

FIG. 5 illustrates an exemplary flowchart to calculate an alignment error in the lever arm of the dual GPS receivers in locating device 230. For example, controller 250 may determine an alignment error in the dual GPS receiver lever arm by comparing the heading calculated using one of the GPS receivers and the heading calculated using both the GPS receivers. In step 501, controller 250 may determine a heading of machine 100 using consecutive positions of one of the dual GPS receivers. Exemplarily, controller 250 may utilize equation (6) to determine the Heading (single receiver). In step 502, controller 250 may calculate the heading of machine 100 using dual GPS receivers. Exemplarily, controller 250 may calculate the Heading (dual receivers) using equation (7).

In step 503, controller 250 may calculate an alignment error in the dual GPS receiver lever arm by taking the difference of Heading (single receiver) and Heading (dual receivers). In step 504, controller 250 may take an average (over time) of the alignment error and determine whether the average alignment error is greater than a threshold value. For example, controller 250 may determine a running average of the alignment error using the last ten alignment error values. The number ten is only an example and any suitable value may be used to calculate an average of the alignment error over time.

If the average alignment error is less a threshold value (step 504: NO), controller 250 may return to step 501 as the alignment error is deemed to be negligible. If the average alignment error is greater than the threshold value (step 504: YES), controller 250 may either flag an error or compensate for the alignment error in the lever arm. For example, controller 250 may compensate for the alignment error if the alignment error is greater than the threshold value but smaller than a second threshold value. If the alignment error is greater than or equal to the second threshold value, controller 250 may flag an error. The details of steps 504 and 505 are similar to steps 304 and 305 discussed earlier. Accordingly, a further description is omitted for purposes of conciseness.

The disclosed exemplary embodiments may allow for an accurate estimation of the pose of machine 100. For example, by determining an alignment error associated with locating device 230 and IMU 210, accurate estimation of the pose of machine 100 may be possible.

It will be apparent to those skilled in the art that various modifications and variations can be made to the disclosed embodiments. Other embodiments will be apparent to those skilled in the art from consideration of the specification and practice of the disclosed embodiments. It is intended that the specification and examples be considered as exemplary only, with a true scope being indicated by the following claims.

What is claimed is:

1. A method for determining an alignment error between sensors mounted to a machine, comprising:
   calculating a first orientation value based on a signal received from a first sensor;
   calculating a second orientation value based on a signal received from a second sensor;
   calculating the alignment error between the first sensor and the second sensor based on a difference between the first orientation value and the second orientation value, wherein the first sensor is a dual forward-aft GPS receiver and the second sensor is an inclinometer; and
   controlling and positioning the machine with an improved estimation of a pose of the machine based on the alignment error between the first sensor and the second sensor.

2. The method of claim 1, wherein the first orientation value and the second orientation value indicate a roll or pitch of the machine.

3. The method of claim 1, wherein the first orientation value and the second orientation indicate a pitch of the machine.

4. The method of claim 1, wherein the first orientation value is calculated using consecutive positions of the first sensor.

5. The method of claim 1, wherein the first sensor is one of the dual forward-aft GPS receivers and the second sensor is the dual forward-aft GPS receivers.

6. The method of claim 5, wherein the first orientation value and the second orientation value indicate a heading of the machine.

7. The method of claim 5, wherein the first orientation value is calculated using consecutive positions of the first sensor.

8. The method of claim 1, further comprising:
   determining that the alignment error is greater than a threshold value, and
   one of compensating for the alignment error and flagging an error in response to determining that the alignment error is greater than the threshold value.

9. A positioning system for determining an alignment error between sensors mounted to a machine, comprising:
   a first sensor;
   a second sensor; and
   a controller in communication with the first sensor and the second sensor, the controller configured to:
      calculate a first orientation value based on a signal received from the first sensor;
      calculate a second orientation value based on a signal received from the second sensor;
      calculate the alignment error between the first sensor and the second sensor based on a difference between the first orientation value and the second orientation value, wherein the first sensor is a dual forward-aft GPS receiver and the second sensor is an inclinometer; and control and position the machine with an improved estimation of a pose of the machine based on the alignment error between the first sensor and the second sensor.

10. The system of claim 9, wherein the first orientation value and the second orientation value indicate a roll or pitch of the machine.

11. The system of claim 9, wherein the first orientation value and the second orientation indicate a pitch of the machine.

12. The system of claim 9, wherein the first orientation value is calculated using consecutive positions of the first sensor.

13. The system of claim 9, wherein the first sensor is one of the dual forward-aft GPS receivers and the second sensor is the dual forward-aft GPS receivers.

14. The system of claim 13, wherein the first orientation value and the second orientation value indicate a heading of the machine.

15. The system of claim 13, wherein the first orientation value is calculated using consecutive positions of the first sensor.

16. The system of claim 9, wherein the controller is further configured to:
   determine that the alignment error is greater than a threshold value, and
   compensate for the alignment error or flag an error in response to determining that the alignment error is greater than the threshold value.

* * * * *